(12) United States Patent
DeCusatis et al.

(10) Patent No.: US 7,197,249 B2
(45) Date of Patent: Mar. 27, 2007

(54) METHOD AND SYSTEM FOR SYNCHRONIZING OPTICAL CLOCKS

(75) Inventors: Casimer M DeCusatis, Poughkeepsie, NY (US); Lawrence Jacobowitz, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 785 days.

(21) Appl. No.: 09/962,500

(22) Filed: Sep. 25, 2001

(65) Prior Publication Data

US 2003/0058010 A1    Mar. 27, 2003

(51) Int. Cl.
*H04B 10/00* (2006.01)

(52) U.S. Cl. .................................................. 398/154

(58) Field of Classification Search ........ 398/154–155, 398/182–201
See application file for complete search history.

(56) References Cited

U.S. PATENT DOCUMENTS 4,989,201 A * 1/1991 Glance ......................... 398/95
6,388,787 B1 * 5/2002 Bischoff ..................... 398/192

OTHER PUBLICATIONS

Bann, R., et al., "Micromachining system accommodates large wafers," Laser Focus World, pp. 189-192, Jan. 2001.
Kartalopoulos, "Introduction To DWDM Technology," IEEE Press, Lucent Technologies, Chapter 3, pp. 67-68, 2000.
"Other Optical Components," Optical Components, Part II, Chapter 9, pp. 131-137.
Carroll, J., et al., "Distributed feedback semiconductor lasers," IEEE Circuits, Devices and Systems Series 10, SPIE Press Monograph, vol. PM52, pp. 9-15, 1998.

* cited by examiner

*Primary Examiner*—Agustin Bello
(74) *Attorney, Agent, or Firm*—Scully, Scott, Murphy & Presser, P.C.; Lisa U. Jaklitsch, Esq.

(57) ABSTRACT

A method and system for synchronizing a local optical clock with a master optical clock, wherein the local clock generates a local clock signal at a local clock wavelength, and said master clock generates a master clock signal at a master clock wavelength. The method comprises the steps of dithering the wavelengths of the local and master clock signals, and generating a control signal representing the difference between the dithered wavelengths of the local and master clock signals. That control signal is then used to synchronize the local clock with the master clock. Preferably, a wavelength-locked loop is used as a means of phase or wavelength control for the optically distributed clock signals. The wavelength-locked loop provides a technique to control the wavelength of a local optical clock source in a manner that will allow the local clock to follow variations in the wavelength of another optical signal.

20 Claims, 2 Drawing Sheets

Example of an Optical Clock Tree

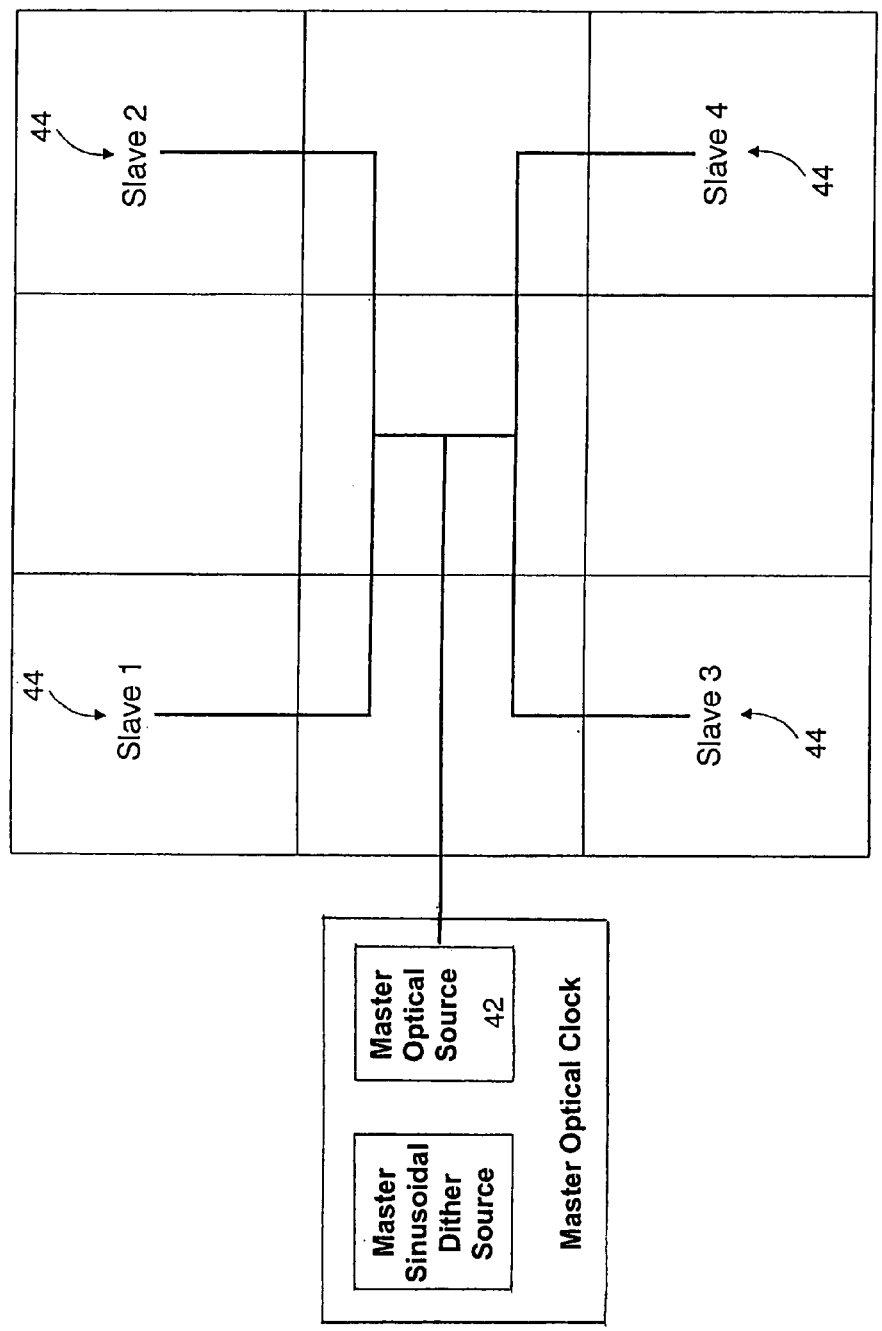

METHOD AND SYSTEM FOR SYNCHRONIZING OPTICAL CLOCKS

BACKGROUND OF THE INVENTION

1. Field of the Invention

This invention generally relates to the provision of synchronous clock pulses to multiple, distributed devices. More specifically, the invention relates to methods and systems that are particularly well suited for providing high frequency synchronous clock pulses to multiple portions of a computer or digital electronic processing system.

2. Prior Art

There are many applications for clock distribution in computer systems, including the transmit and receive byte clock on a digital communication link (either copper or optical), the transmission of a clock signal along with multiple data channels in a parallel optical link with DC coupled receivers (as used in a self-timed interface or similar control bus). Indeed, this concept applies to any level of a computer complex or data communications network, from clock distribution within chips and multichip modules, to distribution on cards and backplanes, to synchronous clocking over wide area networks that span many kilometers using wavelength multiplexing for optical transport. The common feature of all these approaches is that multiple clocks can be synchronized with each other to create multiprocessor clusters or parallel coupled systems, with local clock generation and recovery synchronized across the cluster such that any processor may run from any clock source with no discernable difference in performance. Various implementations of this are possible, including both digital and analog clocking schemes.

The performance and correct operation of complex digital circuits or computer complexes is critically dependent upon the timing of the signals propagated through them; often there are many possible signaling paths through a complex system, each with its own unique timing requirements.

For this reason, the operation of digital circuits is periodically reclocked at intervals known as the cycle time. The cycle time is usually determined by a system clock which produces clock signals of different phases to allow for signal propagation and settling times, to assure that all signals are in the intended logic state when the various digital circuits are permitted to respond to these inputs. Since the cycle times must accommodate all propagation delays and other signal distortion and settling times within the system, the clock cycle must often accommodate the largest delay in the system. The cycle time thus imposes this delay on the entire system and limits the operational speed.

For the same reasons, the key to improving system speed has been to reduce the propagation times of the individual elements in a digital circuit. This approach has been successfully implemented in many conventional designs, resulting in cycle times on the order of 1 to 10 nanoseconds (clock rates of 100 MHz to several GHz). A problem is encountered in the distribution of clock signals since they must be propagated throughout the entire system to maintain synchronization, as opposed to simply clocking a few circuits on a single chip or module where the signals may be more easily regenerated over path lengths of only a few inches. Longer system clock signal paths are subject to noise and distortion, and may include connections which accentuate these effects; such as line termination impedance mismatch in an electrical clock distribution tree. Commonly, the prior art attempts to correct for differential time delays with variations in designs of "deskewing" and buffering or tapped delay-line circuits.

Noise and delay are, therefore, minimized by designing the system master oscillator to run at the lowest frequency permitted by synchronous distribution. In other words, local high speed clocks must receive a synchronizing signal from some source at some minimal interval depending on the required clock precision. Conversely, for a given precision of synchronization, the minimum frequency of the synchronization signal must be increased with an increasing local, high speed clock rate. Difficulties begin to arise with clock or synchronization frequencies above around 100 MHz; using fiber optic technology, clock signals can now be increased into the multi-GHz range or beyond. Use of fiber optic methods is the only practical way to overcome limitations on electrical systems imposed by parasitic capacitance and other reactive electrical characteristics, which often cannot be precisely predicted or modeled at higher frequencies.

SUMMARY OF THE INVENTION

An object of this invention is to improve methods and systems to synchronize clock pulses to multiple, distributed devices.

Another object of the present invention is to control the wavelength (phase) of a local optical clock source in a manner that will allow it to follow variations in the wavelength of another optical signal.

A further object of the invention is to use wavelength-locked loops as a means of phase or wavelength control for optically distributed clock signals.

These and other objectives are attained with a method and system for synchronizing a local optical clock with a master optical clock, wherein the local clock generates a local clock signal at a local clock wavelength, and the master clock generates a master clock signal at a master clock wavelength. The method comprises the steps of dithering the wavelengths of the local and master clock signals, and generating a control signal representing the difference between the dithered wavelengths of the local and master clock signals. That control signal is then used to synchronize the local clock with the master clock.

With the preferred embodiment of the invention, wavelength-locked loops are used as a means of phase or wavelength control for optically distributed clock signals (note that there is a relationship between frequency and wavelength, hence the method disclosed herein can be thought of as a method for locking the frequency of an optical oscillator at extremely high frequencies (THz or above). For these reasons, signals at optical frequencies are often described more conveniently in terms of wavelength). A wavelength-locked loop provides a technique to control the wavelength (phase) of a local optical clock source in a manner that will allow it to follow variations in the wavelength of another optical signal. Therefore, tuners using wavelength locked loops exhibit the useful property of being able to lock on to a signal close to the wavelength of the optical clock source. Such feedback loops are somewhat self-tuning and exhibit very good noise immunity. In this case, the wavelength-locked loops are basically being used to recover a synchronization signal from the optical data link. Since the optical output of the wavelength-locked loop is synchronized to the input optical wavelength, the system is only locally synchronous and does not exhibit a specific phase correlation with the original light source, only the local timing of the optical clock signal.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 2 shows an optical clock tree.

DETAILED DESCRIPTION OF THE PREFERRED EMBODIMENTS

Figure 1:
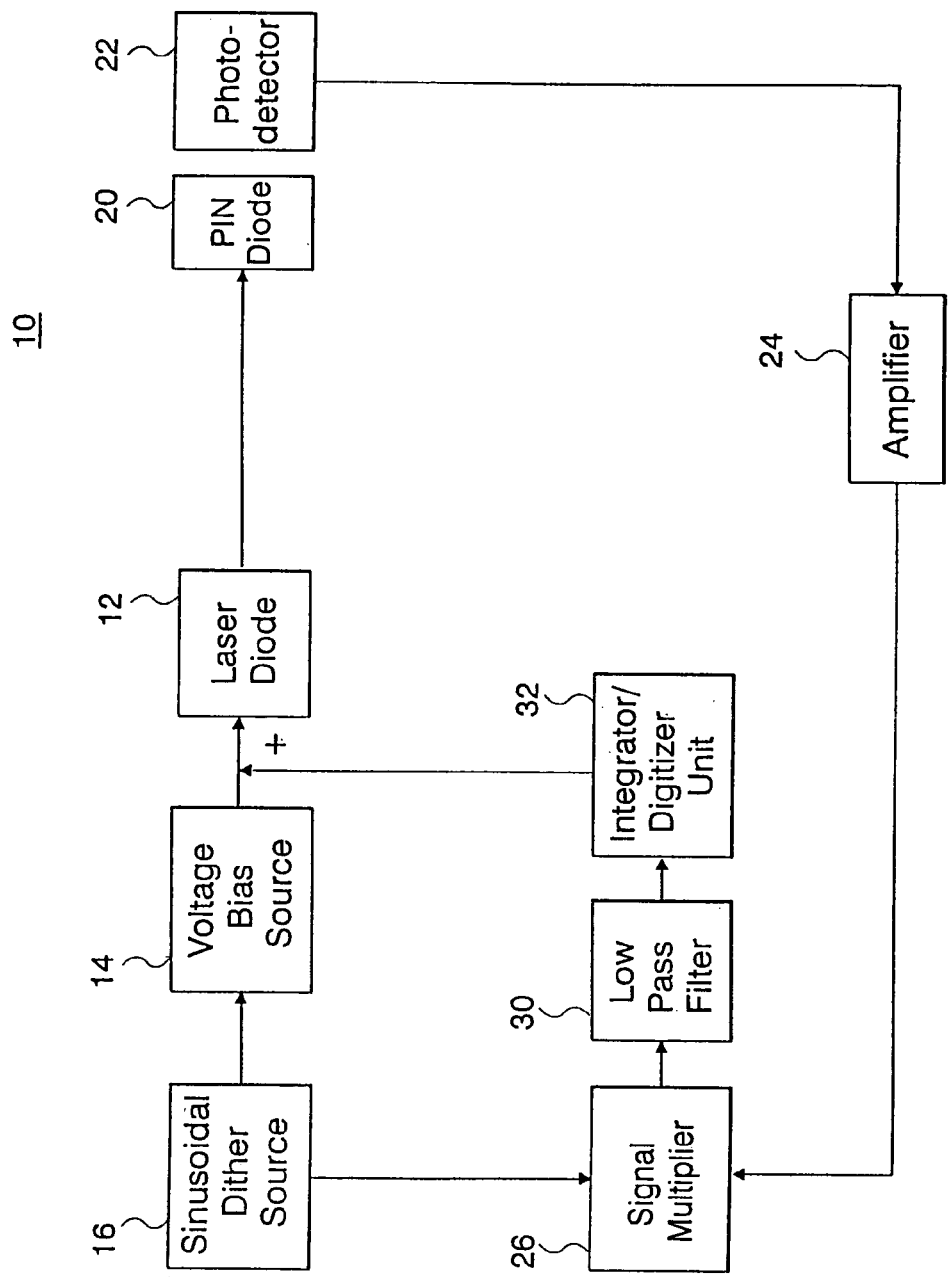
FIG. 1 is a block diagram of an optical clock synchronization system embodying the present invention.

FIG. 1 illustrates an optical clock synchronization system 10 embodying the present invention. This system 10 includes laser diode 12, which is controlled from voltage bias source 14. System 10 further includes sinusoidal dither source 16, optical filter 20, PIN diode 20, amplifier 24, signal multiplier 26, low pass filter 30 and integrate/digitize unit 32.

With the system shown in FIG. 1, the wavelength-locked loop is comprised of a variable wavelength optical oscillator (typically a laser 12 controlled with variations in the drive voltage, ambient temperature, or other means) and a wavelength (or phase) detector. The wavelength (phase) detector can be optical filter 20 or similar wavelength selective element placed in front of a photodetector 22. This detector is configured in a feedback loop to the variable wavelength optical oscillator. The input is a master optical source with a desired wavelength (which is dithered at a rate D1 by an independent oscillator source). The optical filter 20 in front of the PIN diode photodetector 22 has been chosen to match the desired wavelength target. The PIN diode 22 generates a signal which is amplified at 24 and then mixed at 26 with a duplicate local dither source 16 at the same rate, D1; by low pass filtering at 30, integrating and digitizing this signal at 32 (and optionally performing electrical signal processing such as noise reduction or level adjustment) the resulting signal amplitude corresponds to the amount by which the local laser wavelength must be changed to align with the master wavelength. The signal also has the appropriate error sign to indicate whether the desired wavelength is higher or lower than the current wavelength.

The feedback loop is stabilized by the appropriate choices of amplification in the feedback loop, as well as by filtering and integration (smoothing) of the feedback signal. In this manner, the wavelength of the local laser, which was near but not identical to the target wavelength, is slaved to the wavelength of the master laser and will automatically track changes in the master laser wavelength over time. The lock and capture range of the wavelength locked loop is determined by the closeness of the master wavelength and the filter bandpass, and the closeness of the local and master dither source rates.

Using this approach, this invention can provide for synchronization of optical clock rates at very high frequencies. The resulting clocking is stable and synchronous across multiple clock domain boundaries. A clock distribution system is provided which incorporates a primary optical clock source connected to at least one component of the digital circuitry, where the receiving component incorporates a wavelength-locked loop with a oscillator operating at a slightly different wavelength (or phase), and which maintains synchronization of the wavelength at the received end with that at the transmitted or source end of the clock distribution tree. An example of an optical clock distribution tree is given in FIG. 2. In particular, FIG. 2 shows a master clock 42 and a group of distributed slave clocks 44. The synchronization of the distributed clocks 44 with the master clock 42 can be done using either optical waveguides or fibers with splitters and couplers to divide the optical signal; note this distribution tree can be generalized to more than the number of clock domains shown, and to distances ranging from very short to many kilometers.

While the application herein illustrates computer clock distribution trees and optical network implementation examples, the present invention equally well applies to optical backplanes. Photonic devices in integrated optics assemblies may consist of interconnected optical waveguide arrays which include dynamic gain-equalizers/flatteners, dispersion compensators, array waveguide gratings, waveguide Bragg gratings, isolators, splitters, combiners, polarizers, MEMs routers/switches, optical fiber sections, gain amplifiers, modulators, and other devices which all contribute to variable time delays for WDM signals carrying packetized information. Synchronous clock distribution in the optical backplane and from backplane to backplane presents significant applications for the solutions taught herein.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

The invention claimed is:

1. A method of synchronizing a local optical clock with a master optical clock, said local clock generating a local clock signal at a local clock wavelength, and said master clock generating a master clock signal at a master clock wavelength, wherein the master clock wavelength changes over time, the method comprising:
    dithering the wavelengths of the local and master clock signals;
    generating a control signal representing the difference between the dithered wavelengths of the local and master clock signals; and
    using said control signal to synchronize the local clock with the master clock by using said control signed to adjust the wavelength of the local clock signal, as the wavelength of the master clock signal changes, to maintain synchronization between the wavelengths of the local clock signal and the master clock signal, whereby as the wavelength of the master clock signal changes, the wavelength of the local clock signal changes to keep the wavelength of the local clock signal the same as the wavelength of the master clock signal.

2. A method according to claim 1, wherein the generating step includes the steps of:
    conducting at least a portion of the local clock signal through a wavelength selective device implementing a peaked passband function including a center wavelength; and
    generating an output signal representing the difference between the wavelength of the local clock signal and the center wavelength of said peaked passband function.

3. A method according to claim 2, wherein the conducting step includes the step of conducting at least a portion of the local clock signal through a filter that implements said passband function.

4. A method according to claim 1, wherein the dithering step includes the step of dithering the local and master clock signals with approximately the same dither rate.

5. A method according to claim 1, wherein:
the dithering step includes the step of generating a local dither signal, and using the local dither signal to dither the local clock signal; and
the generating step includes the steps of
  i) conducting at least a portion of the local clock signal through a wavelength selective device implementing a peaked passband function to generate a feedback signal, and
  ii) mixing the feedback signal with the local dither signal.

6. A method according to claim 1, wherein the local clock frequency is above 100 Mhz.

7. A method according to claim 1, wherein the generating step includes the step of slaving the wavelength of the local clock signal to the wavelength of the master clock signal so that the local clock wavelength automatically tracks changes in the master clock wavelength over time.

8. A method according to claim 7, wherein the slaving step includes the step of using a wavelength-locked feedback loop to lock the wavelength of the local clock to the wavelength of the master clock.

9. A method according to claim 1, wherein the control signal has a sign proportional to the direction of said difference and an amplitude proportional to the amount of said difference.

10. A distributed clock tree system, comprising:
a master optical clock for generating a master optical clock signal having a master clock wavelength wherein the master clock wavelength changes over time;
a master dither source for dithering the master clock signal;
a plurality of distributed, local devices; and
means for transmitting the master clock signal to each of the local devices; and
wherein each of the local devices includes
  i) a local optical clock for generating a local optical clock signal having a local clock wavelength,
  ii) a local dither source,
  iii) an input for receiving the master optical clock signal, and
  iv) a control circuit for generating a control signal representing the difference between the dithered wavelengths of the local and master clock signals, and for using said control signal to synchronize the local clock with the master clock by using said control signal to adjust the wavelength of the local clock signal, as the wavelength of the master clock signal changes, to maintain synchronization between the wavelengths of the local clock signal and the master clock signal, whereby as the wavelength of the master clock signal changes, the wavelength of the local clock signal changes to keep the wavelength of the local clock signal the same as the wavelength of the master clock signal.

11. A distributed clock tree system according to claim 10, wherein the control circuit includes:
a wavelength selective device implementing a peaked passband function including a center wavelength;
means for conducting at least a portion of the local clock signal through the wavelength selective device; and
a feedback circuit for generating an output signal representing the difference between the wavelength of the local clock signal and the center wavelength of said peaked passband function, and for processing said output circuit to generate the control signal.

12. A distributed clock tree system according to claim 10, wherein the master dither source dithers the master clock signal dithers at a given rate, and the local dither source dithers the local clock signal at a rate approximately the same as the given rate.

13. A distributed clock tree system according to claim 10, wherein:
the local dither source generates a local dither signal, and uses the local dither signal to dither the local clock signal; and
the control circuit includes
  i) a wavelength selective device implementing a peaked passband function to generate a feedback signal,
  ii) means for conducting at least a portion of the local clock signal through the wavelength selective device, and
  iii) a mixer for mixing the feedback signal with the local dither signal.

14. A system for synchronizing a local optical clock with a master optical clock, said local clock generating a local clock signal at a local clock wavelength, and said master clock generating a master clock signal at a master clock dithered wavelength, wherein the master clock wavelength changes over time, the system comprising:
a local dither source for dithering the wavelengths of the local clock signal; and
a control circuit for generating a control signal representing the difference between the dithered wavelengths of the local and master clock signals, and for using said control signal to synchronize the local clock with the master clock by using said control signal to adjust the wavelength of the local clock signal, as the wavelength of the master clock signed changes, to maintain synchronization between the wavelengths of the local clock signal and the master clock signal, whereby as the wavelength of the master clock signal changes, the wavelength of the local clock signal changes to keep the wavelength of the local clock signal as the wavelength of the master clock signal.

15. A system according to claim 14, wherein the control circuit includes:
a wavelength selective device implementing a peaked passband function including a center wavelength;
means for conducting at least a portion of the local clock signal through the wavelength selective device; and
a detector for generating an output signal representing the difference between the wavelength of the local clock signal and the center wavelength of said peaked passband function.

16. A system according to claim 14, wherein wavelength selective device comprises a filter that implements said passband function.

17. A system according to claim 14, wherein the wavelength of the master clock signal dithers at a given rate, and the local dither source dithers the local clock signal at a rate substantially the same as the given rate.

18. A system according to claim 14, wherein:
the dither source generates a local dither signal, and uses the local dither signal to dither the local clock signal; and the control circuit includes
   iv) a wavelength selective device implementing a peaked passband function to generate a feedback signal,
   v) means for conducting at least a portion of the local clock signal through the wavelength selective device, and
a mixer for mixing the feedback signal with the local dither signal.

19. A system according to claim 14, wherein the frequency of the local clock signal is above 100 Mhz.

20. A system according to claim 14, wherein the control circuit includes an optical oscillator for generating the local clock signal;
   a voltage bias source for generating a bias voltage and applying said bias voltage to the optical oscillator; and
   a feedback circuit for generating the control signal and applying the control signal direction to the bias voltage to regulate the wavelength of the master clock signal.

* * * * *